US009482895B2

(12) United States Patent
Okita et al.

(10) Patent No.: US 9,482,895 B2
(45) Date of Patent: Nov. 1, 2016

(54) LIQUID CRYSTAL DISPLAY DEVICE WITH DIFFERENT POLARITY SIGNALS PROVIDED TO PIXEL ELECTRODES FACING A TRANSPARENT FILTER AND A GREEN FILTER

(71) Applicant: Japan Display Inc., Minato-ku (JP)

(72) Inventors: Mitsutaka Okita, Tokyo (JP); Kazuhiro Nishiyama, Tokyo (JP)

(73) Assignee: Japan Display Inc., Minato-ku (JP)

( * ) Notice: Subject to any disclaimer, the term of this patent is extended or adjusted under 35 U.S.C. 154(b) by 13 days.

(21) Appl. No.: 14/298,113

(22) Filed: Jun. 6, 2014

(65) Prior Publication Data

US 2014/0368773 A1 Dec. 18, 2014

(30) Foreign Application Priority Data

Jun. 14, 2013 (JP) .................................. 2013-125938

(51) Int. Cl.
*G09G 3/36* (2006.01)
*G02F 1/1335* (2006.01)
*G09G 3/20* (2006.01)

(52) U.S. Cl.
CPC ....... *G02F 1/133514* (2013.01); *G09G 3/3614* (2013.01); *G09G 3/3648* (2013.01); *G02F 2201/52* (2013.01); *G09G 3/2003* (2013.01); *G09G 2310/0235* (2013.01); *G09G 2320/0247* (2013.01)

(58) Field of Classification Search
CPC .................. G09G 2310/0235; G09G 3/3614; G09G 3/3607; G09G 3/2003
USPC ..................................................... 345/96, 209
See application file for complete search history.

(56) References Cited

U.S. PATENT DOCUMENTS

| | | | |
|---|---|---|---|
| 7,834,946 B2 * | 11/2010 | Horiuchi | G02B 5/201 349/110 |
| 8,525,769 B2 * | 9/2013 | Miyashita | G09G 3/3614 345/209 |
| 2008/0278466 A1 * | 11/2008 | Joo | G09G 3/3614 345/205 |
| 2009/0189881 A1 * | 7/2009 | Ooishi | G09G 3/20 345/211 |
| 2010/0328360 A1 * | 12/2010 | Miyashita | G09G 3/3614 345/690 |
| 2014/0009647 A1 * | 1/2014 | Hayashi | H01L 27/14621 348/266 |

FOREIGN PATENT DOCUMENTS

JP  2009-217052  9/2009

* cited by examiner

*Primary Examiner* — Chanh Nguyen
*Assistant Examiner* — Yuzhen Shen
(74) *Attorney, Agent, or Firm* — Oblon, McClelland, Maier & Neustadt, L.L.P.

(57) ABSTRACT

According to one embodiment, a liquid crystal display device includes array substrate, counter substrate and liquid crystal layer. The array substrate includes a plurality of pixel electrodes, a plurality of gate lines, a plurality of source lines, a plurality of switching elements, a gate driver, and a source driver. The counter substrate includes a color filter. In each frame period, gradation signals of given polarity are applied to a plurality of pixel electrodes facing the transparent filter, while gradation signals of the reverse polarity are applied to a plurality of pixel electrodes facing the green filter.

5 Claims, 8 Drawing Sheets

LIQUID CRYSTAL DISPLAY DEVICE WITH DIFFERENT POLARITY SIGNALS PROVIDED TO PIXEL ELECTRODES FACING A TRANSPARENT FILTER AND A GREEN FILTER

CROSS-REFERENCE TO RELATED APPLICATIONS

This application is based upon and claims the benefit of priority from Japanese Patent Application No. 2013-125938, filed Jun. 14, 2013, the entire contents of which are incorporated herein by reference.

FIELD

Embodiments described herein relate generally to a liquid crystal display device.

BACKGROUND

Liquid crystal displays are used in various electronic devices because they are, for instance, thin and light. In recent years, resolution of liquid crystal displays in mobile communication terminals such as smartphones, and tablet has been increased, and in line with this progress, reducing pixel size to achieve high-definition pictures has become an important requirement. For example, liquid crystal displays having a pixel size that achieves a resolution of more than 300 pixel per inch (ppi) have been commercialized, and displays achieving approximately 500 ppi are under development.

At the same time, mobile communication terminals are required to operate as long as possible on a single battery charge. Thus, the liquid crystal display devices used in the mobile communication terminals are required to achieve lower power consumption.

DETAILED DESCRIPTION

In general, according to one embodiment, there is provided a liquid crystal display device comprising: an array substrate comprising a plurality of pixel electrodes arranged in a matrix, a plurality of gate lines extending in a row direction in which the pixel electrodes are arranged, a plurality of source lines extending in a column direction in which the pixel electrodes are arranged, a plurality of switching elements, a gate driver configured to sequentially drive the gate lines, and a source driver configured to apply gradation signals to the source lines, and each of the switching element being disposed in proximity to a position where a corresponding pair of the gate lines and source lines crosses each other; a counter substrate comprising a color filter including a transparent filter, a red filter, a green filter, and a blue filter arranged periodically in the row direction, each of the transparent, red, green, and blue filters facing one corresponding column of the pixel electrodes; and a liquid crystal layer held between the array substrate and the counter substrate, wherein in each frame period, for the pixel electrodes, the gradation signals of a given polarity are applied to a plurality of pixel electrodes facing the transparent filter, while the gradation signals of the reverse polarity are applied to a plurality of pixel electrodes facing the green filter.

Hereinafter, embodiments are described in detail with reference to the accompanying drawings. In the drawings, structural elements having the same or similar functions will be referred to by the same reference numbers, and in the descriptions, explanation considered redundant will be omitted.

Figure 1:
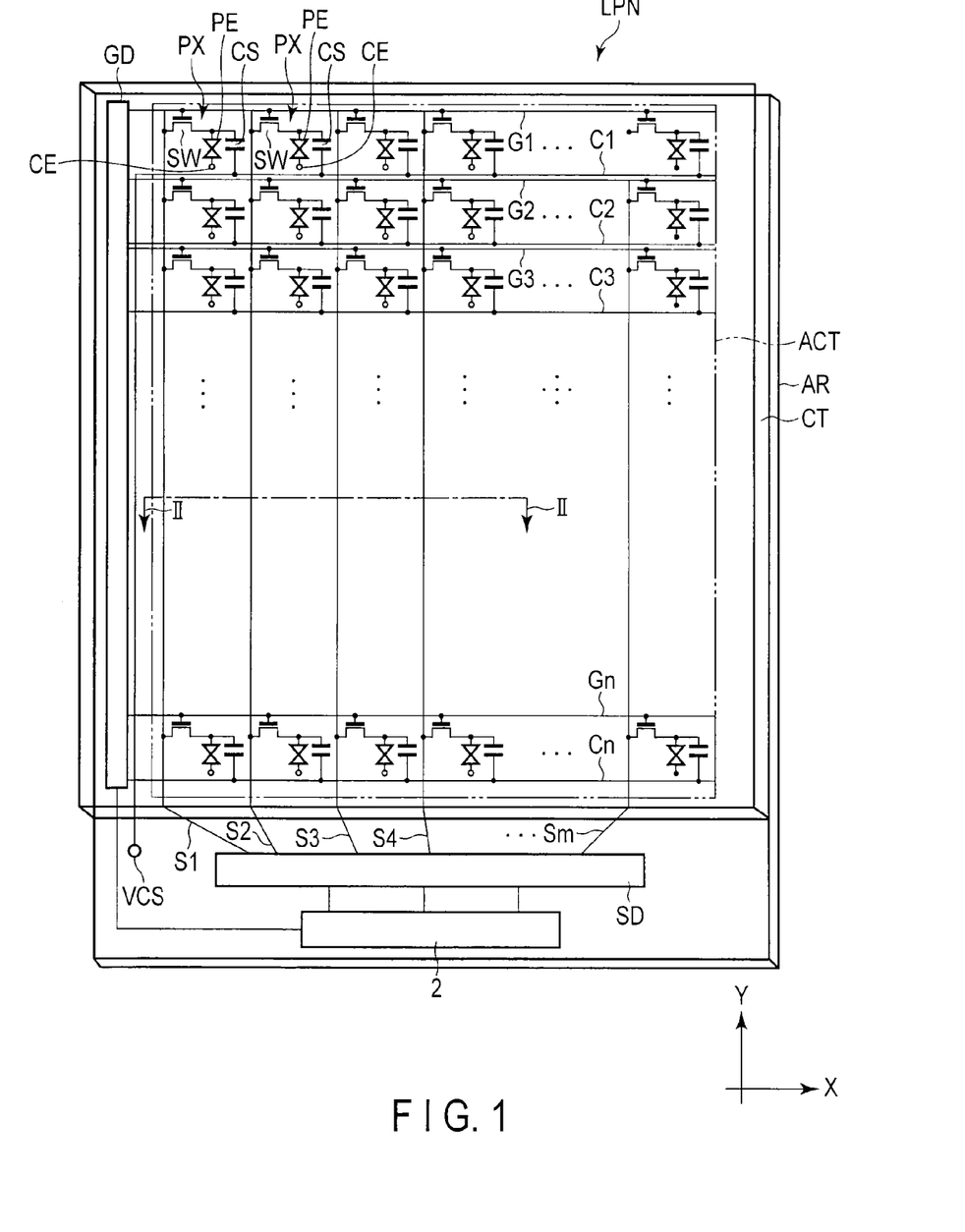
FIG. 1 is a view schematically showing the structure and an equivalent circuit of a liquid crystal display device of a first embodiment.

FIG. 1 is a schematic view showing a structure and an equivalent circuit of a liquid crystal display device of first embodiment.

The liquid crystal display device comprises an active matrix type liquid crystal display panel LPN. The liquid crystal display panel LPN comprises an array substrate AR which is a first substrate, a counter substrate which is a second substrate disposed to face the array substrate AR, and a liquid crystal layer LQ held between the array substrate AR and the counter substrate CT. The liquid crystal display panel LPN comprises a display area (hereinafter referred to as the active area) ACT which displays an image. The active area ACT consists of a plurality of pixels PX arrayed in m×n matrix (where each of m and n is a positive integer).

The liquid crystal display panel LPN comprises, in the active area ACT, n gate lines G (G1 to Gn), n storage capacitance lines C (C1 to Cn), and m source lines S (S1 to Sm). The gate lines G and the storage capacitance lines C extend, for example, substantially linearly in a first direction X. The gate lines G and the storage capacitance lines C are arranged alternately in parallel with a second direction Y crossing the first direction X. Here, the first direction X and the second direction Y are substantially orthogonal to each other. The source lines S cross the gate lines G and the storage capacitance lines C. The source lines S extend substantially linearly in the second direction Y. Note that the gate lines G, storage capacitance lines C, and source lines S are not necessarily extend linearly, and may partly bend or curve.

Each of the gate lines G is pulled outside the active area ACT and is connected to a gate driver GD. Each of the source lines S is pulled outside the active area ACT and is connected to a source driver SD. At least a part of both the gate driver GD and the source driver SD is formed on, for example, the array substrate AR and is connected with a driving IC chip 2 incorporating a controller.

Each pixel PX comprises a switching element SW, pixel electrode PE, common electrode CE, and the like. A storage capacitance Cs is formed, for example, between the storage capacitance line C and the pixel electrode PE. The storage capacitance line C is electrically connected to a voltage applied part VCS to which storage capacitance voltage is applied.

Note that, in the liquid crystal display panel LPN of the present embodiment, the pixel electrode PE is provided on the array substrate AR while the common electrode CE is provided on the counter substrate CT. The liquid crystal display panel LPN uses mainly an electric field formed between the pixel electrode PE and the common electrode CE for switching liquid crystal molecules of the liquid crystal layer LQ. The electric field formed between the pixel electrode PE and the common electrode CE is substantially orthogonal to an X-Y plane defined by the first direction X and the second direction Y or a substrate main surface.

The switching element SW is structured by, for example, a thin film transistor (TFT). The switching element SW is electrically connected to the gate lines G and the source lines S. The switching element may be of either a top gate type or a bottom gate type. The semiconductor layer of the switching element SW is formed of, for example, a polysilicon material here, but may be formed of an amorphous silicon material.

The gate electrode of the switching element SW is electrically connected to (or formed integrally with) its corresponding gate line G. The source electrode of the switching element SW is electrically connected to (or formed integrally with) its corresponding source line S. The drain electrode of the switching element SW is electrically connected to (or formed integrally with) its corresponding pixel electrode PE.

The pixel electrode PE is disposed in each pixel PX and is electrically connected to the switching element SW. The common electrode CE is arranged to be common with the pixel electrodes PE of pixels PX through the liquid crystal layer LQ. The pixel electrode PE and the common electrode CE are formed of a transparent electrode material such as indium tin oxide (ITO) or indium zinc oxide (IZO), but may be instead formed of metallic materials such as aluminum.

The array substrate AR comprises a feeder (not shown) to apply voltage to the common electrode CE. The feeder is formed, for example, outside the active area ACT. The common electrode CE is pulled outside the active area ACT and is electrically connected to the feeder via a conductive material which is not shown.

Figure 2:
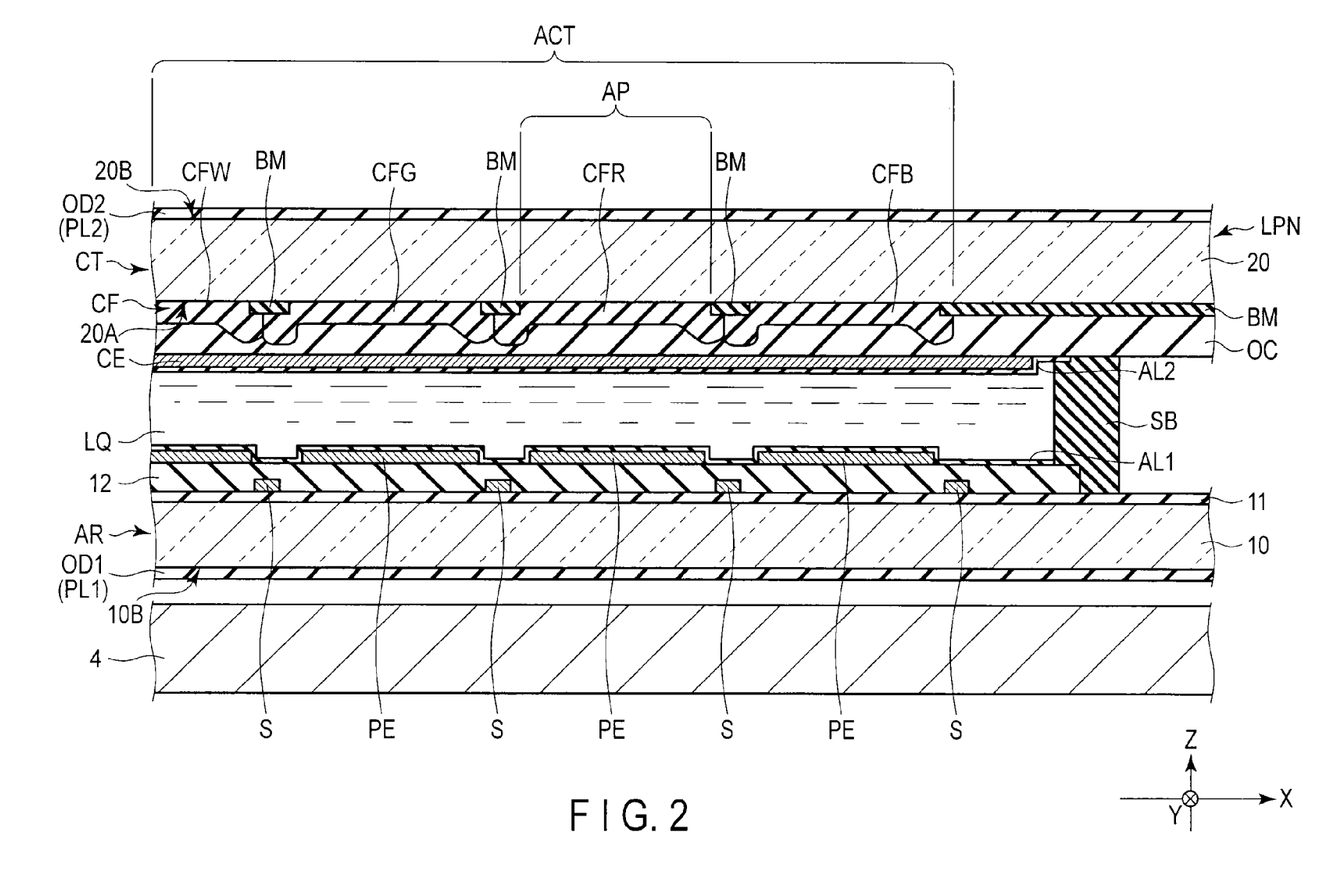
FIG. 2 is a cross-sectional view showing the structure of the liquid crystal display device in FIG. 1, taken along line II-II.

FIG. 2 is a cross-sectional view schematically illustrating the liquid crystal display device, taken along line II-II in FIG. 1. Note that only the parts necessary for the descriptions are shown in FIG. 2. Furthermore, a third direction Z is a direction orthogonal to both the first direction X and the second direction Y, or a direction of the normal of the liquid crystal display panel LPN.

The liquid crystal display panel LPN is composed of the array substrate AR at whose back surface a backlight unit 4 is disposed. Various types may optionally be adopted for the backlight unit 4. Furthermore, the light source thereof may optionally be light emitting diodes (LEDs), a cold cathode fluorescent tube (CCFL), or the like. The detailed description is thus omitted here.

The array substrate AR is formed of a first insulating substrate 10 which is transparent. The source line S is formed on a first interlayer insulating film 11 and is covered with a second interlayer insulating film 12. Note that the gate line and storage capacitance line that are not shown are disposed, for example, between the first insulating substrate 10 and the first interlayer insulating film 11. The pixel electrode PE is formed on the second interlayer insulating film 12.

A first alignment film AL1 is disposed on a surface of the array substrate AR facing the counter substrate CT and covers substantially the entire area of the active area ACT. The first alignment film AL1 covers the pixel electrode PE and the like, and is disposed on the second interlayer insulating film 12 as well. The first alignment film AL1 is formed of a horizontal alignment type material.

The counter substrate CT is formed of a second insulating substrate 20 which is transparent. The counter substrate CT comprises a black matrix BM, color filter CF, overcoat layer OC, common electrode CE, and second alignment film AL2.

The black matrix BM divides pixels PX into each pixel and forms an aperture AP facing the pixel electrode PE. That is, the black matrix BM is disposed to face such lines as source line S, gate line, storage capacitance line, and switching element and the like. The black matrix BM in FIG. 2 is a part extending in the second direction Y; however, it may also comprise a part extending along the first direction X. The black matrix BM is disposed on an inner surface 20A of the second insulating substrate 20 facing the array substrate AR.

The color filter CF is disposed to correspond to each pixel PX. That is, the color filter CF is disposed in the aperture AP in the inner surface 20A of the second insulating substrate 20 and a part thereof overlaps with the black matrix BM. The color filter CF comprises color filters of several different colors and transparent (colorless) filters those are disposed on each of the pixels PX adjacent to each other in the first direction X.

For example, the color filter CF is composed of a colored resin material in the primary colors of red, blue, and green and a transparent resin material which is colorless. A red filter CFR which is formed of a resin material colored red is disposed to correspond to a red pixel. A blue filter CFB which is formed of a resin material colored blue is disposed to correspond to a blue pixel. A green filter CFG which is formed of a resin material colored green is disposed to correspond to a green pixel. A transparent filter CFW which is formed of a transparent resin material is disposed to correspond to a white pixel. The boundaries of the red, blue, green, and transparent filters overlap the black matrix BM.

In the present embodiment, the transparent filter CFW, green filter CFG, red filter CFR, and blue filter CFB are arranged in the order stated in the first direction X.

The overcoat layer OC covers the color filter CF. The overcoat layer OC reduces the influence of the unevenness on the surface of the color filter CF.

The common electrode CE is formed on the overcoat layer OC at its side facing the array substrate AR. The common electrode CE is laid over the active area ACT and faces a plurality of pixel electrodes PE.

The second alignment film AL2 is disposed on the counter substrate CT at its surface facing the array substrate AR and extends covering substantially the entire area of the active area ACT. The second alignment film AL2 covers the common electrode CE and overcoat layer OC and the like.

The first alignment film AL1 and the second alignment film AL2 have been subjected to, if required, an alignment film treatment process (such as a rubbing or a light alignment process) for initial alignment of liquid crystal molecules of the liquid crystal layer LQ.

The array substrate AR and the counter substrate CT are positioned in such a manner that the first alignment film AL1 faces the second alignment film AL2. Therein, a columnar spacer formed integrally with one of the substrates using, for example, a resin material is interposed between the array substrate AR and the counter substrate CT. The columnar spacer forms a cell gap of, typically, 2 to 7 μm. The array substrate AR and the counter substrate CT are bound together by a sealing member SB outside the active area ACT while the cell gap is being formed.

The liquid crystal layer LQ is held by the cell gap formed between the array substrate AR and the counter substrate CT to be disposed between the first alignment film AL1 and the second alignment film AL2. Such a liquid crystal layer LQ is formed of, for example, a liquid crystal material whose dielectric anisotropy is positive (which is of a positive type).

A first optical element OD1 is attached by an adhesive agent or the like to the outer surface of the array substrate AR, that is, the outer surface 10B of the first insulating substrate 10 of the array substrate AR. The first optical element OD1 is disposed at a side facing the backlight unit 4 of the liquid crystal display panel LPN to control polarization of light incident from the backlight unit 4 on the liquid crystal display panel LPN. The first optical element OD1 includes a first polarizer PL1 having a first polarization axis (or a first absorption axis) which is not shown.

A second optical element OD2 is attached by an adhesive agent or the like to the outer surface of the counter substrate CT, that is, the outer surface 20B of the second insulating substrate 20 of the counter substrate CT. The second optical element OD2 is disposed at a display surface side of the liquid crystal display panel LPN to control polarization of light from the liquid crystal display panel LPN. The first optical element OD2 includes a second polarizer PL2 having a second polarization axis (or a second absorption axis) which is not shown.

The first polarization axis of the first polarizer PL1 and the second polarization axis of the second polarizer PL2 are arranged to be, for example, orthogonal to each other. The first polarizer PL1 and the second polarizer PL2 are in a cross-Nicol state.

In the above liquid crystal display device, the color filter CF includes the transparent filter CFW in addition to the red filter CFR, green filter CFG, and blue filter CFB. The transparent filter CFW increases the transparency of the liquid crystal display panel LPN and reduces power consumption.

Now, a drive method of the liquid crystal display device is described as an example.

Figure 3:
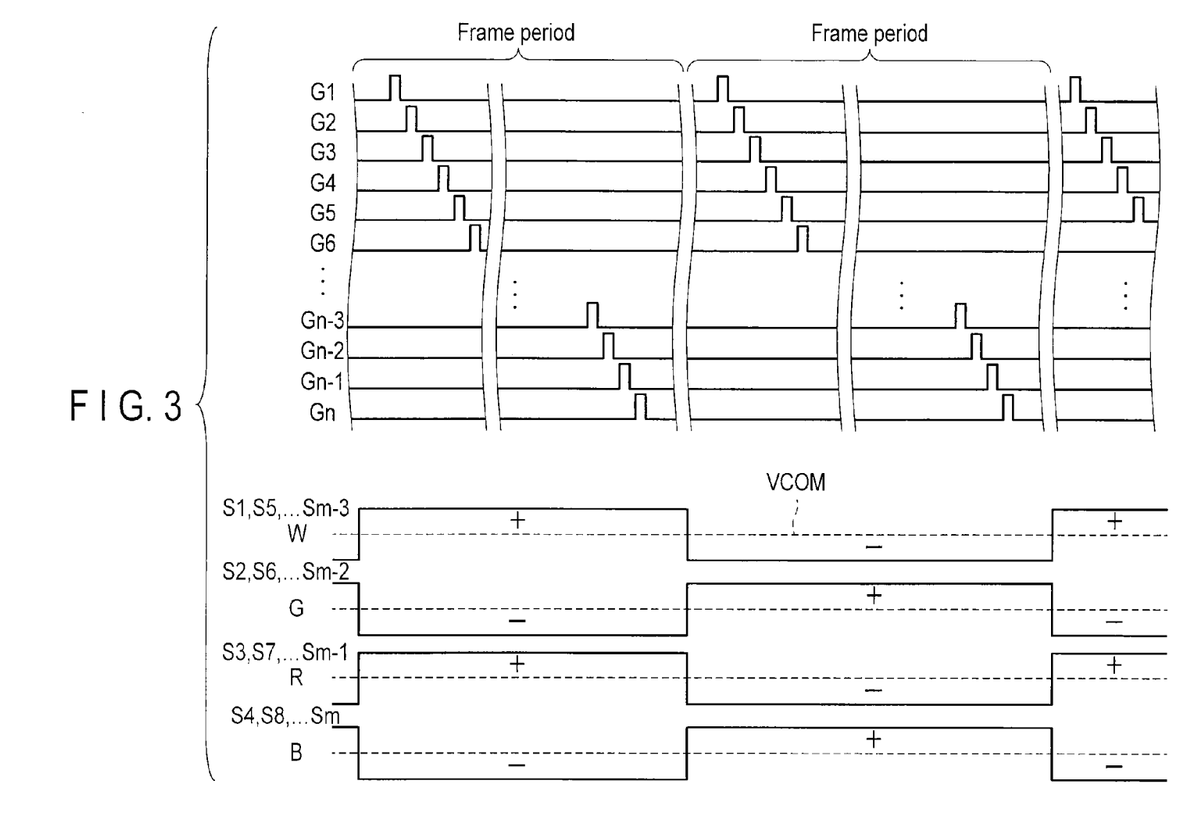
FIG. 3 is a timing chart explaining a drive method for the liquid crystal display device of the first embodiment which includes a liquid crystal display panel in FIG. 2.

FIG. 3 is a timing chart explaining an example of a drive method of the liquid crystal display device of the present embodiment. Note that, in the liquid crystal display device of the present embodiment, a column inversion drive scheme is adopted as a polarity inversion drive scheme. Furthermore, in FIG. 3, the same level of intermediate gradation is used in every pixel PX.

The gate driver GD drives gate lines G1, G2, G3, . . . , Gn sequentially in a single frame period based on a horizontal synchronization signal and a vertical synchronization signal and the like that are received from the driving IC chip 2. In the switching element SW connected to the driven gate line G, electric conduction occurs between a source electrode and a drain electrode.

Based on the horizontal synchronization signal, vertical synchronization signal, and video signals received from the driving IC chip 2, the source driver SD sequentially applies gradation signals corresponding to the video signals to the source lines S1, S2, S3, . . . , Sm. The gradation signals are applied to their corresponding pixel electrodes PE via the switching elements SW.

Here, the polarity of the gradation signals to two adjacent source lines S is always opposite while the polarity of gradation signals supplied to each of the source lines S is inverted in every frame period. Thus, in each frame period, the gradation signals to the pixel electrode PE facing the transparent filter CFW has a polarity opposite to that of the gradation signal applied to the pixel electrode PE facing the green filter CFG.

For example, in one frame period, positive gradation signals are applied to source lines S1, S5, . . . , Sm−3, which correspond to the white pixels; negative gradation signals are applied to source lines S2, S6, . . . , Sm−2, which correspond to the green pixels; positive gradation signals are applied to source lines S3, S7, . . . , Sm−1, which correspond to the red pixels; and negative gradation signals are applied to source lines S4, S8, . . . , Sm, which correspond to the blue pixels.

In the next frame period, negative gradation signals are applied to source lines S1, S5, . . . , Sm−3, which correspond to the white pixels; positive gradation signals are applied to source lines S2, S6, . . . , Sm−2, which correspond to the green pixels; negative gradation signals are applied to source lines S3, S7, . . . , Sm−1, which correspond to the red pixels; and positive gradation signals are applied to source lines S4, S8, . . . , Sm, which correspond to the blue pixels.

As can be understood from the above, in each frame period, the gradation signals of a given polarity are applied to source lines S1, S5, . . . , Sm−3, which correspond to the white pixels, and to source lines S3, S7, . . . , Sm−1 which correspond to the red pixels while the gradation signals of the reverse polarity are applied to source lines S2, S6, . . . , Sm−2, which correspond to the green pixels, and to source lines S4, S8, . . . , Sm, which correspond to the blue pixels.

That is, in each frame period, the gradation signals of a given polarity are applied to the pixel electrodes PE facing the transparent filter CFW and the red filter CFR, while the gradation signals of the reverse polarity are applied to the pixel electrodes facing the green filter CFG and the blue filter CFB.

Here, in liquid crystal display devices of a color display type including red, green, blue, and white pixels, the green and white pixels tend to be received as being much brighter than the red and blue pixels. This causes visible flicker in a picture when the white and green pixels are driven by signals of the same polarity and the common electrode voltage VCOM is shifted. For example, such a flicker is visible even in a white or intermediate gradation raster display, or in any normal display pattern such as black and white stripes.

Considering the above, in the present embodiment, the columns of white pixels and the columns of green pixels are disposed to be adjacent to each other in the first direction X in the liquid crystal display device in which the column inversion drive is adopted in every other column of the pixels PX so that the white pixels and the green pixels can contribute to the picture based on the gradation signals of reverse polarity.

That is, the present embodiment can suppress a difference in brightness between the pixels displaying to the picture based on positive polarity signals and the pixels displaying to the picture based on negative polarity signals. Therefore, the present embodiment can suppress such display degradation as a flicker or the like and can provide a liquid crystal display device having excellent display quality.

Figure 4:
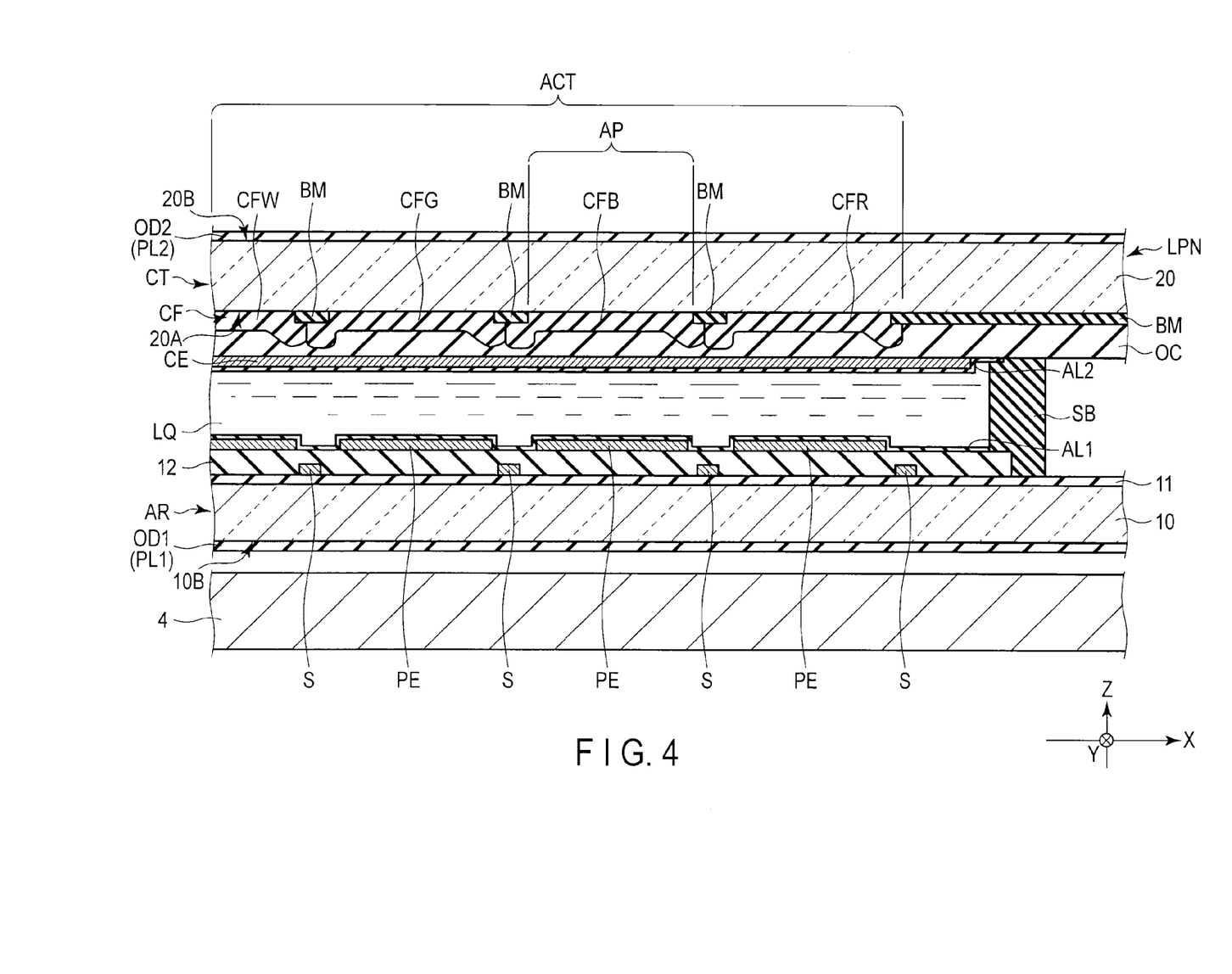
FIG. 4 is a cross-sectional view schematically showing a structure of a modified example of the liquid crystal display device of the first embodiment.

FIG. 4 is a cross-sectional view schematically illustrating a modified example of the liquid crystal display device of the first embodiment.

In FIG. 4, the color filter CF has a structure different from that of the liquid crystal display device described above. That is, in this example, the transparent filter CFW, green filter CFG, blue filter CFB, and red filter CFR are arranged in the order stated in the first direction X. in other words, the liquid crystal display device has the same structure as the above liquid crystal display device except for the color filter CF.

Now, a drive method of the liquid crystal display device including the liquid crystal display panel LPN shown in FIG. 4 is described as an example.

Figure 5:
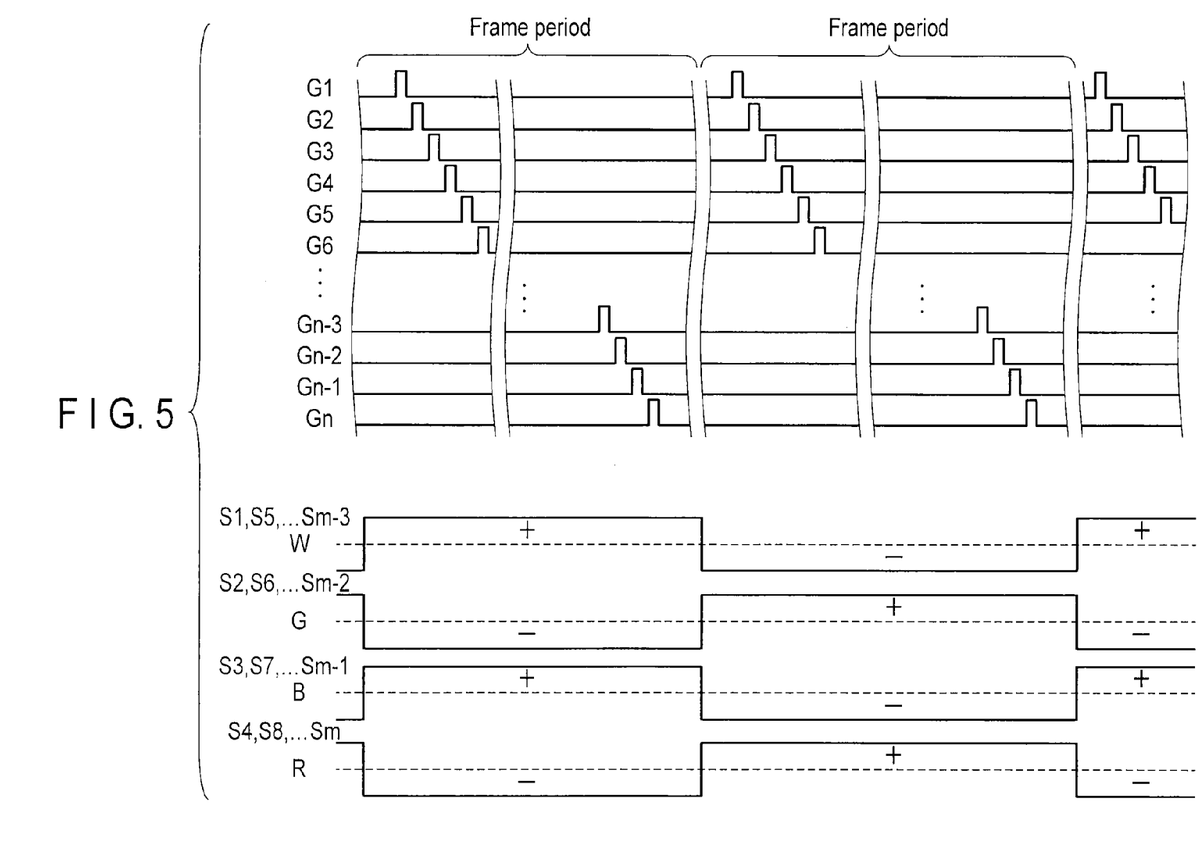
FIG. 5 is a timing chart explaining a drive method for the modified example of the liquid crystal display device of the first embodiment, the liquid crystal display device including a liquid crystal display panel in FIG. 4.

FIG. 5 is a timing chart explaining a drive method of the modified example of the liquid crystal display device of the first embodiment. Note that, in the liquid crystal display device of this example, the column inversion drive scheme is adopted as a polarity inversion drive scheme. Furthermore, in FIG. 5, the same level of intermediate gradation is used in every pixel PX.

The gate driver GD drives gate lines G1, G2, G3, ..., Gn sequentially in a single frame period based on a horizontal synchronization signal and a vertical synchronization signal and the like that are received from the driving IC chip 2.

Based on the horizontal synchronization signal, vertical synchronization signal, and video signals received from the driving IC chip 2, the source driver SD applies gradation signals corresponding to the video signals to source lines S1, S2, S3, ..., Sm sequentially.

In one frame period, positive gradation signals are applied to source lines S1, S5, ..., Sm−3, which correspond to the white pixels; negative gradation signals are applied to source lines S2, S6, ..., Sm−2, which correspond to the green pixels; positive gradation signals are applied to source lines S3, S7, ..., Sm−1, which correspond to the blue pixels; and negative gradation signals are applied to source lines S4, S8, ..., Sm, which correspond to the red pixels.

In the next frame period, negative gradation signals are applied to source lines S1, S5, ..., Sm−3, which correspond to the white pixels; positive gradation signals are applied to source lines S2, S6, ..., Sm−2 which correspond to the green pixels; negative gradation signals are applied to source lines S3, S7, ..., Sm−1, which correspond to the blue pixels; and positive gradation signals are applied to source lines S4, S8, ..., Sm, which correspond to the red pixels.

As can be understood from the above, in each frame period, the gradation signals of a given polarity are applied to source lines S1, S5, ..., Sm−3, which correspond to the white pixels, and source lines S3, S7, ..., Sm−1, which correspond to the blue pixels, while the gradation signals of the reverse polarity are applied to the source lines S2, S6, ..., Sm−2, which correspond to the green pixels, and source lines S4, S8, ..., Sm, which correspond to the red pixels.

That is, in each frame period, the gradation signals of a given polarity are applied to the pixel electrodes PE facing the transparent filter CFW and the blue filter CFB, while the gradation signals of the reverse polarity are applied to the pixel electrodes facing the green filter CFG and the red filter CFR.

Considering the above, in this example, the columns of white pixels and the columns of green pixels are disposed to be adjacent to each other in the first direction X in the liquid crystal display device in which the column inversion drive is adopted in every other column of the pixels PX so that the white pixels and the green pixels can contribute to the picture based on the gradation signals of different polarity.

That is, this example can suppress a difference in brightness between the pixels displaying to the picture based on positive polarity signals and the pixels displaying to the picture based on negative polarity signals. On top of that, the difference in brightness can be suppressed more than it is suppressed by the liquid crystal display device of the above-described embodiment. Therefore, as with the above-mentioned embodiment, the liquid crystal display device including the liquid crystal display panel LPN in FIG. 4 can suppress such display degradation as a flicker or the like and can provide excellent display quality.

Next, a liquid crystal display device of second embodiment will be described in detail with reference to accompanying drawings.

Figure 6:
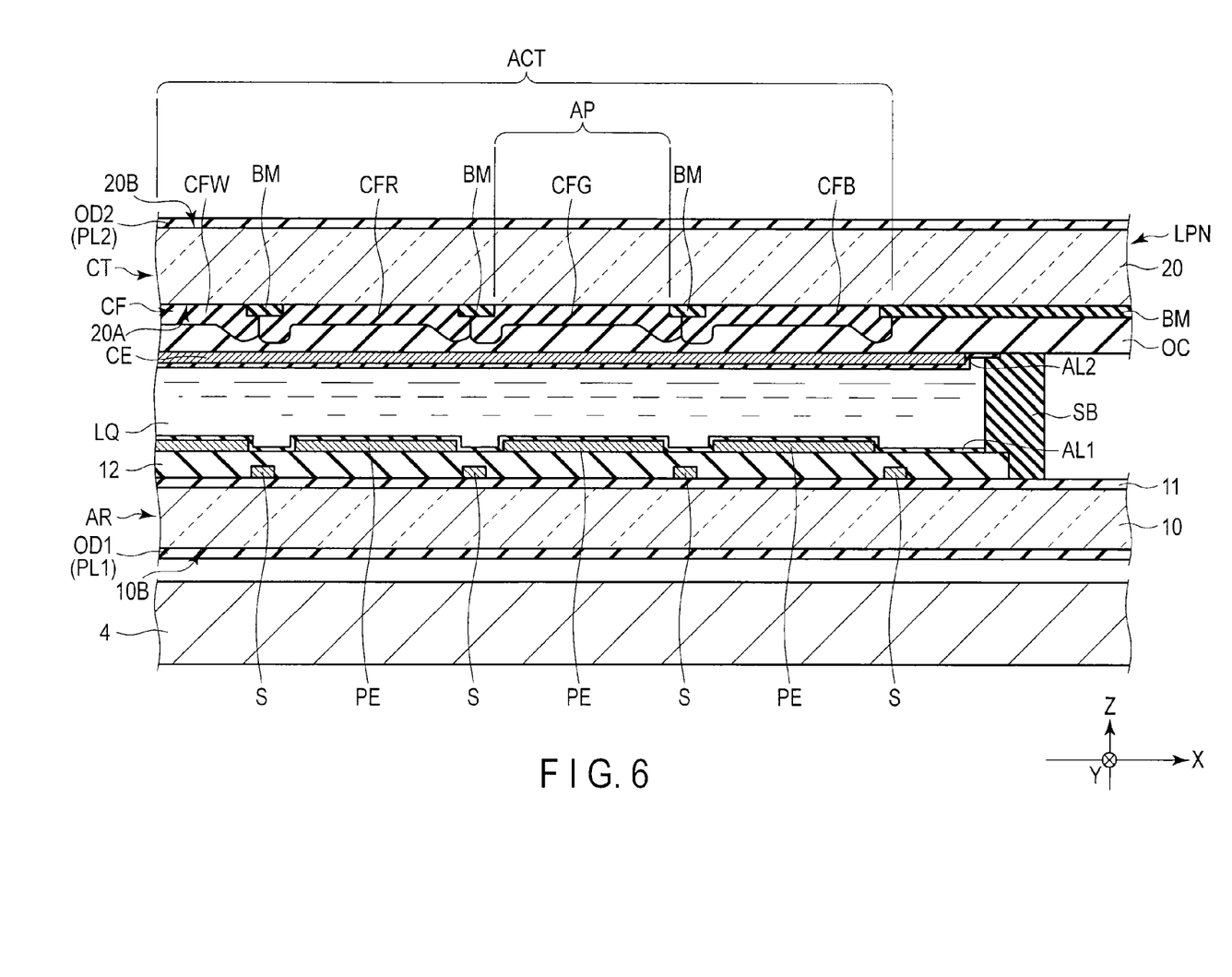
FIG. 6 is a cross-sectional view schematically showing the structure of a liquid crystal display device of a second embodiment.

FIG. 6 is a cross-sectional view schematically showing a structure of the liquid crystal display device of the second embodiment.

In the liquid crystal display device of the present embodiment, the structure of the color filter CF and the drive method of the liquid crystal display device are different from those of the liquid crystal display device of the first embodiment. That is, in the liquid crystal display device, a transparent filter CFW, red filter CFR, green filter CFG, and blue filter CFB are arranged in the order stated in the direction X.

That is, the liquid crystal display device of the present embodiment is structured the same as the above liquid crystal display device of the first embodiment except for the color filter CF.

Now, a drive method of the liquid crystal display device including the liquid crystal display panel LPN shown in FIG. 6 is described as an example.

Figure 7:
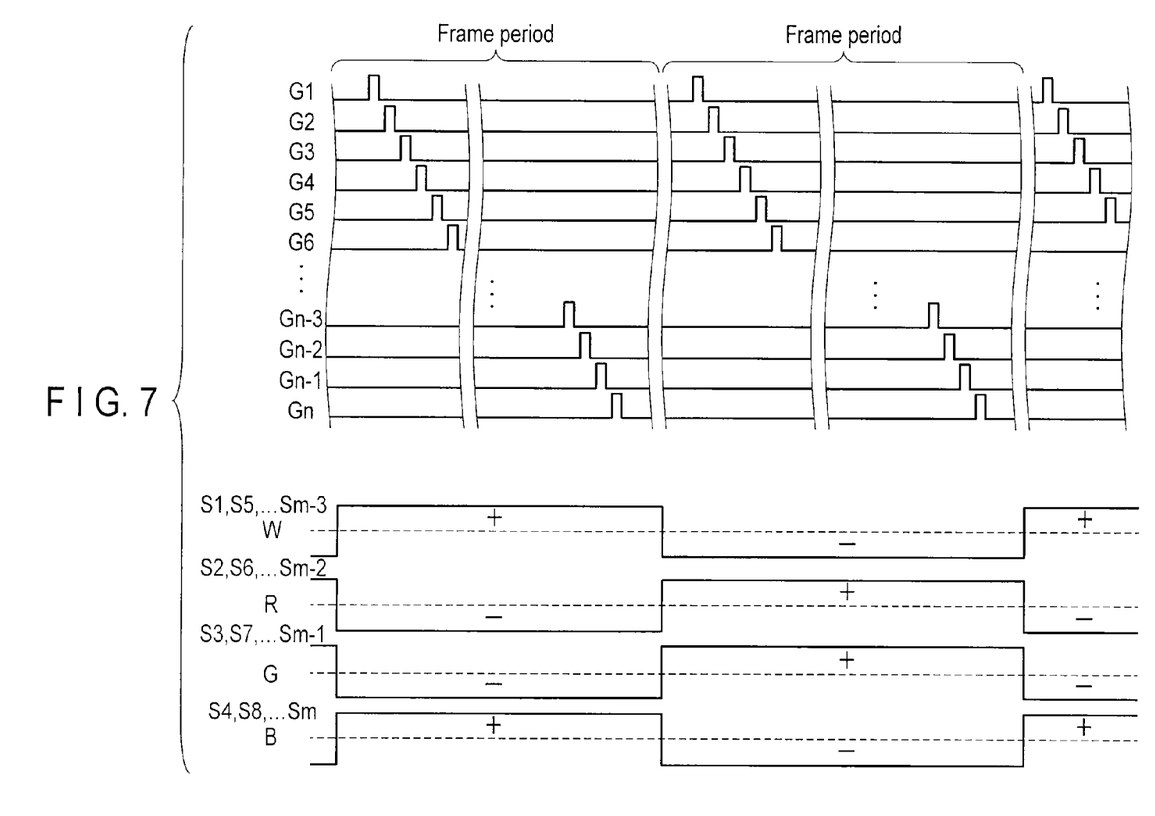
FIG. 7 is a timing chart explaining a drive method for the liquid crystal display device of the second embodiment which includes a liquid crystal display panel in FIG. 6.

FIG. 7 is a timing chart explaining an example of a drive method of the liquid crystal display device of the present embodiment. Note that, in the liquid crystal display device of the present embodiment, the column inversion drive scheme is adopted as a polarity inversion drive scheme. Furthermore, in FIG. 7, the same level of intermediate gradation is used in every pixel PX.

The gate driver GD drives gate lines G1, G2, G3, ..., Gn sequentially in a single frame period based on a horizontal synchronization signal and a vertical synchronization signal and the like that are received from the driving IC chip 2.

Based on the horizontal synchronization signal, vertical synchronization signal, and video signals received from the driving IC chip 2, the source driver SD applies gradation signals corresponding to the video signals to source lines S1, S2, S3, ..., Sm sequentially.

In one frame period, positive gradation signals are applied to source lines S1, S5, ..., Sm−3, which correspond to the white pixels; negative gradation signals are applied to source lines S2, S6, ..., Sm−2, which correspond to the red pixels; negative gradation signals are applied to source lines S3, S7, ..., Sm−1, which correspond to the green pixels; and positive gradation signals are applied to source lines S4, S8, ..., Sm, which correspond to the blue pixels.

In the next frame period, negative gradation signals are applied to source lines S1, S5, ..., Sm−3, which correspond to the white pixels; positive gradation signals are applied to the source lines S2, S6, ..., Sm−2, which correspond to the red pixels; positive gradation signals are applied to the source lines S3, S7, ... Sm−1, which correspond to the green pixels; and negative gradation signals are applied to the source lines S4, S8, ... Sm, which correspond to the blue pixels.

As can be understood from the above, in each frame period, the gradation signals of a given polarity are applied to source lines S1, S5, ... Sm−3, which correspond to the white pixels and source lines S4, S8, ..., Sm, which correspond to the blue pixels, while the gradation signals of the reverse polarity are applied to the source lines S3, S7, ..., Sm−1, which correspond to the green pixels and the source lines S2, S6, ..., Sm−2, which correspond to the red pixels.

That is, in each frame period, the gradation signals of a given polarity are applied to the pixel electrodes PE facing the transparent filter CFW and the blue filter CFB, while the gradation signals of the reverse polarity are applied to the pixel electrodes facing the green filter CFG and the red filter CFR.

In the present embodiment, the white pixels and green pixels are disposed in every other column in the liquid crystal display device in which column inversion drive is adopted in every two columns of the pixels PX so that the white pixels and the green pixels can display to the picture based on the gradation signals of different polarity.

That is, the present embodiment can avoid a difference in brightness between the pixels displaying to the picture based on positive polarity signals and the pixels displaying to the picture based on negative polarity signals from increasing. Therefore, as with the above-described embodiment, the present embodiment can suppress such display degradation as a flicker or the like and can provide a liquid crystal display device having excellent display quality.

Now, another example of the liquid crystal display device will be described.

Figure 8:
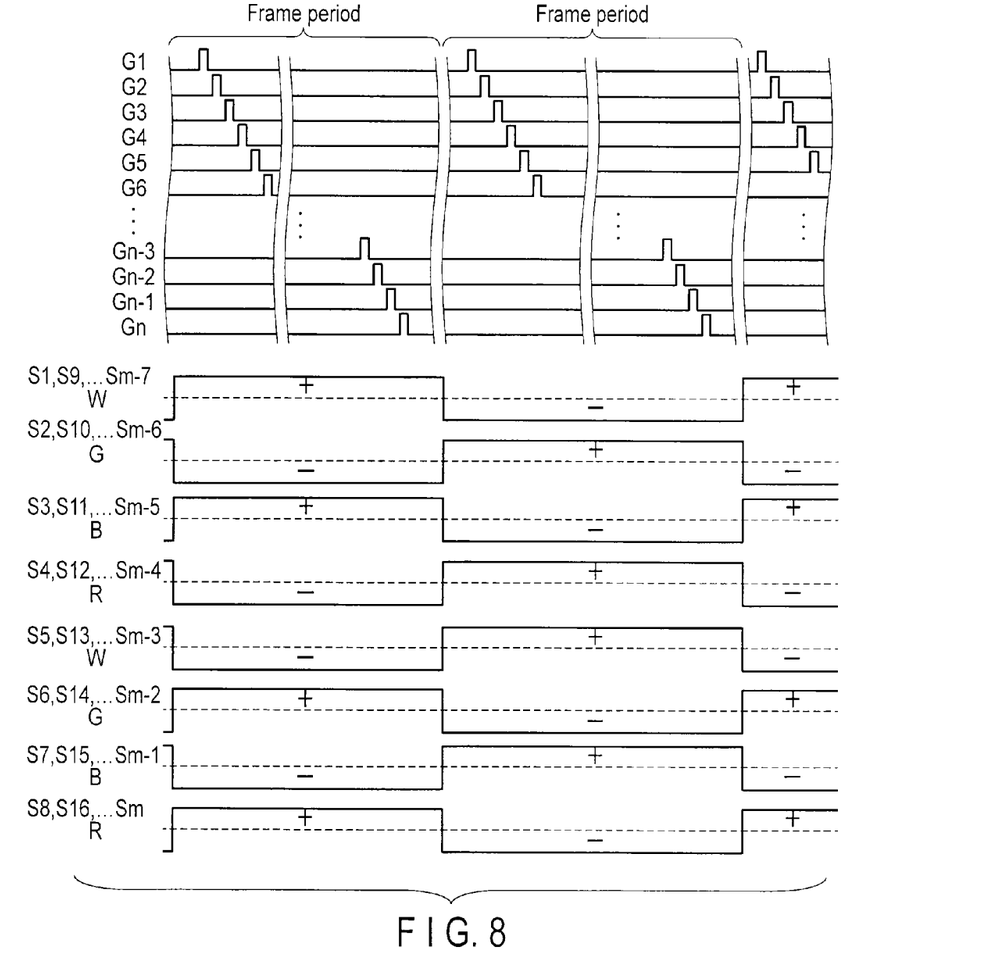
FIG. 8 is a timing chart explaining another drive method for the modified example of the liquid crystal display device of the first embodiment, the liquid crystal display device including the liquid crystal display panel in FIG. 4.

FIG. 8 is a timing chart explaining another example of a drive method of the modified example of the liquid crystal display device of the first embodiment. Here, the liquid crystal display device includes the liquid crystal display panel LPN in FIG. 4. Note that, in the modified example, a column inversion drive scheme is adopted as a polarity inversion drive scheme. Furthermore, in FIG. 8, the same level of intermediate gradation is used in every pixel PX.

In this example, the transparent filter CFW and the green filter CFG are adjacent to each other in a row direction (first direction X) and pixel electrodes PE face the adjacent transparent and green filters, respectively. In each frame period, gradation signals of a given polarity are applied to the transparent filter CFW and its corresponding pixel electrode PE, while gradation signals of the reverse polarity are applied to the green filter CFG and its corresponding pixel electrode PE. Furthermore, considering the columns of the pixel electrodes PE facing the color filters, the polarity of the gradation signals applied to the pixel electrodes PE adjacent to each other in the first direction X is inverted in every other column in each frame.

In each frame period, gradation signals of a given polarity are applied to a plurality of pixel electrodes facing one kind of the transparent, red, green, and blue filters, while gradation signals of the reverse polarity are applied to a plurality of pixel electrodes facing the other kind of the transparent, red, green, and blue filters adjacent to the one filter in the row direction.

The drive method described below is applicable to the liquid crystal display device including the liquid crystal display panel LPN in FIG. 4. That is, in this example, the transparent filter CFW, green filter CFG, blue filter CFB, and red filter CFR are arranged in the order stated in the first direction X.

The gate driver GD drives gate lines G1, G2, G3, ..., Gn sequentially in a single frame period based on a horizontal synchronization signal and a vertical synchronization signal and the like that are received from the driving IC chip 2.

Based on the horizontal synchronization signal, vertical synchronization signal, and video signals received from the driving IC chip 2, the source driver SD sequentially applies gradation signals corresponding to the video signals to the source lines S1, S2, S3, ..., Sm. In this example, in each frame period, gradation signals of a given polarity are supplied from the source driver SD to one quartet of source lines S arranged in the first direction X while gradation signals of the reverse polarity are supplied from the source driver SD to the other quartet of source lines S adjacent to the one quartet of source lines S.

Specifically, in one frame period, positive gradation signals are applied to source lines S1, S9, ..., Sm−7, which correspond to the white pixels; negative gradation signals are applied to source lines S2, S10, ..., Sm−6, which correspond to the green pixels; positive gradation signals are applied to source lines S3, S11, ..., Sm−5, which correspond to the blue pixels; and negative gradation signals are applied to source lines S4, S12, ..., Sm−4, which correspond to the red pixels.

Furthermore, negative gradation signals are applied to source lines S5, S13, ..., Sm−3, which correspond to the white pixels; positive gradation signals are applied to source lines S6, S14, ..., Sm−2 those correspond to the green pixels; negative gradation signals are applied to source lines S7, S15, ..., Sm−1, which correspond to the blue pixels; and positive gradation signals are applied to source lines S8, S16, ..., Sm, which those correspond to the red pixels.

In the next frame period, negative gradation signals are applied to source lines S1, S9, ..., Sm−7, which correspond to the white pixels; positive gradation signals are applied to source lines S2, S10, ..., Sm−6, which correspond to the green pixels; negative gradation signals are applied to source lines S3, S11, ..., Sm−5, which correspond to the blue pixels; and positive gradation signals are applied to source lines S4, S12, ..., Sm−4, which correspond to the red pixels.

Furthermore, positive gradation signals are applied to source lines S5, S13, ..., Sm−3, which correspond to the white pixels; negative gradation signals are applied to source lines S6, S14, ..., Sm−2, which correspond to the green pixels; positive gradation signals are applied to source lines S7, S15, ..., Sm−1 which correspond to the blue pixels; and negative gradation signals are applied to the source lines S8, S16, ..., Sm, which correspond to the red pixels.

As can be understood from the above, in each frame period, the gradation signals of a given polarity are applied to source lines S1, S9, ..., Sm−7, which correspond to the white pixels; and source lines S3, S11, ..., Sm−5, which correspond to the blue pixels; while the gradation signals of the reverse polarity are applied to source lines S2, S10, ..., Sm−6, which correspond to the green pixels; and source lines S4, S12, ..., Sm−4, which correspond to the red pixels.

Similarly, in each frame period, the gradation signals of a given polarity are applied to source lines S5, S13, ..., Sm−3, which correspond to the white pixels, and source lines S7, S15, ..., Sm−1, which correspond to the blue pixels, while the gradation signals of the reverse polarity are applied to the source lines S6, S14, ..., Sm−2, which correspond to the green pixels, and source lines S8, S16, ..., Sm, which correspond to the red pixels.

As can be understood from the above, in the four columns of adjacent pixels PX, the column of the white pixels and the column of the green pixels are disposed adjacent to each other in the first direction X so that the white pixels and the green pixels adjacent to each other can display to the picture based on the gradation signals of different polarity.

That is, this example can avoid a difference in brightness between the pixels displaying to the picture based on positive polarity signals and the pixels displaying to the picture based on negative polarity signals from increasing. In addition, the difference in brightness can be suppressed more than it is suppressed by the liquid crystal display device of the above-described second embodiment.

Furthermore, looking at the two quartets (eight columns) of adjacent pixels PX, gradation signals of a given polarity are applied to source lines S1, S9, . . . , Sm−7, which correspond to the white pixels, while gradation signals of the reverse polarity are applied to source lines S5, S13, . . . Sm−3 which also correspond to the white pixels. Similarly, gradation signals of a given polarity are applied to source lines S2, S10, . . . , Sm−6, which correspond to the green pixels, while gradation signals of the reverse polarity are applied to source lines S6, S14, . . . , Sm−2, which also correspond to the green pixels. Gradation signals of a given polarity are applied to source lines S3, S11, . . . , Sm−5, which correspond to the blue pixels while gradation signals of the reverse polarity are applied to source lines S7, S15, . . . , Sm−1 which also correspond to the blue pixels. Gradation signals of a given polarity are applied to source lines S4, S12, . . . , Sm−4, which correspond to the red pixels, while gradation signals of the reverse polarity are applied to source lines S8, S16, . . . , Sm which also correspond to the red pixels.

That is, looking at each of the color pixel columns, adjacent pixel columns display to the picture based on gradation signals of reverse polarity in a single frame period. Therefore, the above drive method can suppress a flicker in a monochrome display or the like. The monochrome display here includes a monochrome intermediate gradation display, and may refer to, for example, a full screen red color display or the like.

Therefore, as with the above-described embodiment, the liquid crystal display device described with reference to FIG. 8 can suppress such display degradation as a flicker or the like and can provide excellent display quality.

The drive method in FIG. 8 is applicable to the liquid crystal display device including the liquid crystal display panel LPN in FIG. 2. In that case, specifically, the transparent filter CFW, green filter CFG, blue filter CFB, and red filter CFR may be arranged in the order stated in the first direction X, or may be arranged in the transparent, green, red, and blue pixels order in the first direction X. In either case, the same technical advantage can be obtained as in the case where the liquid crystal display device including the liquid crystal display panel LPN in FIG. 4.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The above-described embodiments have been presented given that they are utilized in a liquid crystal display device of vertical field mode; however, they are not limited to such a liquid crystal display device and are of course utilizable in a liquid crystal display device of horizontal field mode.

What is claimed is:

1. A liquid crystal display device comprising:
an array substrate comprising a plurality of pixel electrodes arranged in a matrix, a plurality of gate lines extending in a row direction in which the pixel electrodes are arranged, a plurality of source lines extending in a column direction in which the pixel electrodes are arranged, a plurality of switching elements, a gate driver configured to sequentially drive the gate lines, and a source driver configured to apply gradation signals to the source lines, and each of the switching element being disposed in proximity to a position where a corresponding pair of the gate lines and source lines crosses each other;
a counter substrate comprising a color filter including a transparent filter, a red filter, a green filter, and a blue filter arranged periodically in the row direction, each of the transparent, red, green, and blue filters facing one corresponding column of the pixel electrodes; and
a liquid crystal layer held between the array substrate and the counter substrate,
wherein
in each frame period, for the pixel electrodes, the gradation signals of a given polarity are applied to all pixel electrodes facing the transparent filter, while the gradation signals of the reverse polarity are applied to all pixel electrodes facing the green filter, and
in each frame period, for the pixel electrodes, the gradation signals of a same polarity are applied to all the pixel electrodes facing the transparent filter and a plurality of pixel electrodes facing the red filter, while the gradation signals of a same polarity are applied to all the pixels electrodes facing the green filter and a plurality of pixel electrodes facing the blue filter.

2. The liquid crystal display device of claim 1, wherein the transparent filter, green filter, red filter, and blue filter are arranged in the order stated in the row direction.

3. A liquid crystal display device comprising:
an array substrate comprising a plurality of pixel electrodes arranged in a matrix, a plurality of gate lines extending in a row direction in which the pixel electrodes are arranged, a plurality of source lines extending in a column direction in which the pixel electrodes are arranged, a plurality of switching elements, a gate driver configured to sequentially drive the gate lines, and a source driver configured to apply gradation signals to the source lines, and each of the switching element being disposed in proximity to a position where a corresponding pair of the gate lines and source lines crosses each other;
a counter substrate comprising a color filter including a transparent filter, a red filter, a green filter, and a blue filter arranged periodically in the row direction, each of the transparent, red, green, and blue filters facing one corresponding column of the pixel electrodes; and
a liquid crystal layer held between the array substrate and the counter substrate,
wherein
the transparent filter and the green filter are arranged in the row direction to be adjacent to each other,
in each frame period, for the pixel electrodes, the gradation signals of a given polarity are applied to all pixel electrodes facing the transparent filter, while the gradation signals of the reverse polarity are applied to all pixel electrodes facing the green filter, and
in each frame period, for the pixel electrodes, the gradation signals of given polarity are applied to all pixel electrodes facing the transparent and red filters, while the gradation signals of the reverse polarity are applied to all pixel electrodes facing green and blue filters in the row direction.

4. The liquid crystal display device of claim 3, wherein the transparent filter, green filter, blue filter, and red filter are arranged in the order stated in the row direction.

5. The liquid crystal display device of claim 3, wherein the transparent filter, green filter, red filter, and blue filter are arranged in the order stated in the row direction.

* * * * *